United States Patent [19]

Little et al.

[11] Patent Number: 5,703,296
[45] Date of Patent: Dec. 30, 1997

[54] PRESSURE SENSOR HAVING REDUCED HYSTERESIS AND ENHANCED ELECTRICAL PERFORMANCE AT LOW PRESSURES

[75] Inventors: Lewis Henry Little, Peru; Russell Bolin Hopkins, Greentown; John Michael Matly, Kokomo, all of Ind.

[73] Assignee: Delco Electronics Corp., Kokomo, Ind.

[21] Appl. No.: 590,710

[22] Filed: Jun. 27, 1995

[51] Int. Cl.$^6$ ................................ G01L 7/00
[52] U.S. Cl. ........................................ 73/756
[58] Field of Search ..................... 73/706, 720, 721, 73/726, 727, 756; 338/4, 42; 374/143

[56] References Cited

U.S. PATENT DOCUMENTS

| | | | |
|---|---|---|---|
| 4,930,353 | 6/1990 | Kato et al. | 73/727 |
| 5,319,980 | 6/1994 | Kremidas | 73/727 |
| 5,386,730 | 2/1995 | Ikeda et al. | 73/706 |

*Primary Examiner*—Richard Chilcot
*Assistant Examiner*—William L. Oen
*Attorney, Agent, or Firm*—Mark A. Navarre

[57] ABSTRACT

A pressure sensor suitable for sensing low pressure environments. The pressure sensor includes a piezoresistive sensing element enclosed within a protective housing, and utilizes an insert molded into the housing for supporting the sensing element and concentrating stresses within the housing at a maximum distance from the sensing element. The insert is adapted to work in cooperation with a constraint to isolate the sensing element from stresses within the housing, so as to improve the electrical performance of the sensing element to low pressure environments, such as an evaporative emission system of an automobile.

14 Claims, 1 Drawing Sheet

PRESSURE SENSOR HAVING REDUCED HYSTERESIS AND ENHANCED ELECTRICAL PERFORMANCE AT LOW PRESSURES

BACKGROUND OF INVENTION

1. Field of Invention

The present invention generally relates to pressure sensing devices. More particularly, this invention relates to a fuel vapor pressure sensing element characterized by having reduced hysteresis, such that the sensing element is capable of accurately sensing low pressures under changing temperature conditions.

2. Description of Prior Art

Piezoresistive sensing elements are utilized to rapidly and accurately detect pressures in an increasingly wide array of applications, including the hostile environment of automobiles. The output of such a sensing element is a result of a change in resistance that occurs within the silicon-based die material of the element in response to pressure exerted on the element by the particular environment being detected. This output can then be utilized by the engine control unit to enhance a vehicle's performance and overall safety.

Sensors developed for automotive applications must often be able to effectively operate within a hostile chemical and thermal environment without affecting the sensor's structural integrity or its performance, including sensitivity and hysteresis. A partial solution to this problem is to enclose the sensing element within protective packaging. However, a particularly problematic source of output error and hysteresis for low pressure piezoresistive sensors is thermal stresses induced by material mismatch and bonding and assembly methods, which are aggravated by temperature extremes common within an automotive environment. For example, while a piezoresistive sensing element is generally formed from a silicon material, the remainder of the sensor package is typically formed from a more readily formable material, such as plastic or metal. Because a material mismatch is present, steps must be taken to adequately separate the piezoresistive sensing element from its packaging in order to insure that the output of the sensing element accurately reflects the surrounding pressure conditions and not extraneous influences from the environment through its packaging. This requirement is particularly crucial if low pressures are being sensed, such as fuel vapor pressures within an evaporative emission system of an automobile.

One method for physically isolating a sensing element is to use a flexible or soft adhesive, such as a silicone, to bond the sensing element to its packaging. A flexible adhesive accommodates differences in coefficients of thermal expansion that exist between packaging and the silicon material of the sensing element, and therefore enables the element and its packaging to expand and contract individually such that stresses induced in the packaging are isolated from the sensing element. However, a significant drawback of this solution is that adhesives which exhibit sufficient flexibility are not generally resistant to the environment found in automotive applications. More particularly, such adhesives are not resistant to petroleum-based products such as gasoline and lubricants. Therefore, a sensor package employing a flexible adhesive would likely perform poorly in the hostile chemical environment of an automobile, such as within the fuel system of an automobile.

Another approach for physically isolating a sensing element is to use an isolation constraint formed from a suitable material and disposed between the sensing element and its packaging. For this approach to effectively achieve isolation of the sensing element, the constraint must be formed of a material having a coefficient of thermal expansion that is roughly the same as that of the sensing element. In practice, glass materials have been found useful for isolating a silicon sensing element from a plastic or metal package. However, the constraint must be relatively large to have a significant isolation effect on the sensing element, particularly when low pressures on the order of about 1.5 psig or less are to be detected, as is the case with sensors used to measure fuel vapor pressure within an automobile fuel system. Accordingly, a shortcoming of this approach is that optimum sensor isolation will generally necessitate a large sensor package in order to accommodate both the sensing element and the large constraint. Consequently, manufacturing costs will be substantially higher due not only to additional material requirements, but also an increased cost of retooling existing production lines to accommodate a larger package size. Furthermore, large constraints have been associated with poor electrical performance for piezoresistive sensing elements at low temperatures. This effect is due to the high processing temperatures required to bond the sensing element to the constraint, such that the effects of material mismatch become more prominent at lower temperatures and obscure the output of the sensing element induced by the surrounding pressure.

Yet another approach to solving the problem of physically isolating a sensing element is to make the sensing element and its package from the same material, and fabricate the element and package as integral parts of a unitary structure. If the entire sensor package is constructed from a single material, thermally-induced stresses are reduced since all the components will expand or contract to the same degree in response to a change in temperature. Mechanically-induced stresses may also be reduced because stress distribution may be more uniform throughout the package. However, the material requirements for the sensing element and its packaging differ significantly, such that this approach is not typically a viable option.

From the above, it is apparent that the prior art lacks an adequate solution to the detrimental effect that extraneous stresses can have on the output and hysteresis characteristics of a piezoresistive sensing element, and particular piezoresistive sensing elements used to detect low pressures. Accordingly, what is needed is a pressure sensor that is able to accurately sense pressures in a hostile environment, yet be relatively isolated from extraneous stresses induced within the sensor package by the surrounding environment. It would be particularly desirable if such a sensor could be extremely sensitive to low pressure, yet entail an uncomplicated package that minimizes manufacturing and material costs.

SUMMARY OF THE INVENTION

It is an object of this invention to provide a pressure sensor having a piezoresistive sensing element that is substantially isolated from external stresses imposed on and generated within the sensor package.

It is another object of this invention to provide a technique by which isolation of a piezoresistive sensing dement within a sensor package can be enhanced without necessitating a significant increase in the size of the sensor package.

It is yet another object of this invention that such a sensor package reduce thermally-induced stresses by reducing the adverse effect of material mismatch between the sensing element and the package, while enabling a sensor package that is readily manufacturable.

It is a further object of this invention to provide a pressure sensor characterized by low hysteresis and enhanced electrical performance at low pressures.

In accordance with a preferred embodiment of this invention, these and other objects and advantages are accomplished as follows.

Generally, this invention relates to a pressure sensing device particularly adapted for sensing low pressure environments, and particularly sensing devices that employ a piezoresistive sensing element enclosed within a protective housing. In accordance with this invention, the sensing device utilizes an insert molded into the housing for supporting the sensing element and concentrating stresses within the housing at a distance from the sensing element. The insert is adapted to work in cooperation with a constraint to isolate the sensing element from stresses within the housing, so as to reduce hysteresis and enhance the electrical performance of the sensing element to low pressure environments, such as near-atmospheric pressures within an evaporative emission system of an automobile.

The pressure sensing device of this invention generally includes a sensing element enclosed within a housing. The sensing element is of the type which is formed from a material whose electrical properties change in response to a pressure exerted on the sensing element by a surrounding environment, a characteristic exemplified by piezoresistive materials. Furthermore, the sensing element has a coefficient of thermal expansion that is different from, and typically less than, the coefficient of thermal expansion of the housing. The sensing device further includes a constraint member with which the sensing element is interconnected to the housing, such that the sensing element is spaced apart from the housing. The constraint member has a coefficient of thermal expansion that is approximately equal to the coefficient of thermal expansion of the sensing element, or at least intermediate the coefficients of thermal expansion of the sensing element and the housing.

The insert of this invention is disposed in the housing so as to be intermediate the constraint member and the housing, and is molded into the housing such that at least a portion of the peripheral surface of the insert contacts the housing. Furthermore, the insert has a coefficient of thermal expansion that is approximately equal to the coefficient of thermal expansion of the sensing element, or at least approximately equal to the coefficient of thermal expansion of the constraint member and/or intermediate the coefficients of thermal expansion of the sensing element and the housing. As such, the insert serves to isolate the sensing element and the constraint member from stresses transmitted through the housing, including thermally-induced and mechanically-induced stresses.

As a result of the above, the pressure sensing device of this invention is characterized by being significantly less sensitive to external mechanical stresses transmitted through the housing and thermally-induced stresses that arise due to a material mismatch between the housing and the remaining components of the sensing device. More specifically, the insert of this invention is uniquely adapted to inhibit the transmission of stresses from the housing to the sensing element, and therefore promotes the electrical performance of the sensing element and reduces hysteresis in the output of the sensing element. Consequently, the sensing device of this invention is more readily able to accurately sense low pressures, and particularly near-atmospheric pressures, because the sensing element is relatively isolated from stresses that would otherwise result in a significant output error due to the magnitude of external stresses being comparatively larger than stresses induced in the sensing element by pressures exerted by its surroundings.

In effect, the insert of this invention functions to substantially isolate the pressure sensing element from its housing by approximately matching the coefficient of thermal expansion of the pressure sensing element, and concentrating any thermally-induced stresses within the insert. Another advantageous aspect of the present invention is that the insert is able to effectively isolate the sensing element without complicating the construction and fabrication of the sensing device and its components. As such, the invention provides for a cost efficient method for achieving the desired result, and is therefore well suited for mass produced automotive sensors that are required to sense low pressures, such as fuel vapor pressure sensors used in evaporative emission systems.

Finally, the inclusion of the insert within the structure of the housing permits the remaining components of the sensing device to have substantially conventional configurations. For example, the constraint member need not be oversized in an effort to further reduce the transmission of thermally-induced stresses to the sensing element. As a result, the low temperature sensitivity of the sensing device need not be compromised by using a relatively larger constraint member, and the sensor housing is not required to be redesigned to accommodate a larger constraint member. Instead, the insert of this invention allows for superior performance while enabling a minimally-sized housing.

In addition, the pressure sensing device of this invention permits the use of relatively stiff but chemical-resistant adhesives to bond the constraint member to the insert. Such an advantage is critical in applications where the pressure sensing device must operate in corrosive environment, such as an automotive fuel system.

Other objects and advantages of this invention will be better appreciated from the following detailed description.

BRIEF DESCRIPTION OF THE DRAWINGS

The above and other advantages of this invention will become more apparent from the following description taken in conjunction with the accompanying drawings, in which.

DETAILED DESCRIPTION OF THE PREFERRED EMBODIMENT

Figure 1:
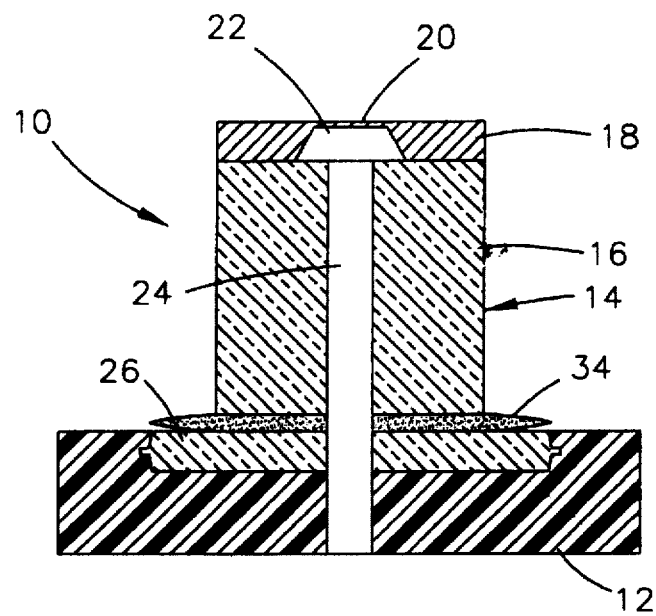
FIG. 1 is a cross-sectional view of a pressure sensing device in accordance with a first embodiment of this invention.

FIG. 1 represents in cross-section a pressure sensing device 10 configured in accordance with an embodiment of this invention. As shown, the pressure sensing device 10 is generally constructed to have two primary components. A first component is a protective housing 12 that is designed to prevent external hazards from damaging the internal components of the pressure sensing device 10. While plastic is a preferred material for the housing 12, it is foreseeable that various other materials, including metals, could be used, depending on the degree of protection required and the size and weight constraints of the application. The second component of the pressure sensing device 10 is a pressure cell 14 for accurately monitoring the pressure of the surrounding environment.

The pressure cell 14 of this invention is shown as being composed of two basic components. A base or pedestal portion of the pressure cell 14 is a constraint 16 that supports a pressure sensing element 18, which responds to pressure changes in the environment of the sensing device 10. The constraint 16 is preferably formed from a glass material, such as borosilicate, and is therefore resistant to a wide range of hostile thermal and chemical environments. The sensing element 18 is preferably formed from a piezoresistive material, such as a doped silicon, such that the electrical resistance of the sensing element 18 is responsive to a change in stress within the element 18. For this purpose, the sensing element 18 is formed to include a diaphragm 20 that is able to flex slightly in response to pressure exerted on a surface of the sensing element 18 exposed to its surroundings. While an absolute pressure sensing configuration could be adapted, the device 10 as shown is adapted to sense a differential pressure by exposing an interior surface of the diaphragm 20 to a reference pressure. The reference pressure is transmitted to the diaphragm 20 through a passage 24 formed in the housing 12 and the constraint 16, terminating in a cavity 22 formed within the sensing element 18 and beneath the diaphragm 20. The sensor element 18 is preferably electrostatically bonded to the constraint 16 so as to form a hermetic seal between the element 18 and constraint 16.

As with prior art sensors, the constraint 16 serves to isolate the sensing element 18 from the housing 12 by attenuating stresses imposed at the housing-constraint interface. The sensing element 12 is attached to an end of the constraint 14 opposite this interface, so that the effects of external forces and stresses on the housing 12 are minimized. Such effects include poor electrical performance at low pressures due to extraneous stresses being at a significant level and induced in the sensing element 18 by the surroundings, and increased hysteresis due to material mismatch between the housing 12 and the sensing element 18. To permit the constraint 14 to act as an isolation medium, the constraint 14 must be formed from a material having a coefficient of thermal expansion at least intermediate that of the sensing element 18 and the housing 12, and preferably approximately equal to the coefficient of thermal expansion of the material forming the sensing element 18. The preferred glass materials for the constraint 16 and preferred piezoresistive materials for the sensing element 18 have coefficients of thermal expansion of about $3.25\times10^{-6}$ mm/mm·°C. and about $2.5\times10^{-6}$ mm/mm·°C., respectively, and are therefore sufficiently close to suitably optimize the ability of the constraint 16 to serve as an isolation medium for the sensing element 18.

According to this invention, it has been determined that the above construction alone is incapable of achieving adequate electrical performance at low pressures, and is prone to hysteresis in the output of the sensing element 18. It has further been determined that the presence of an insert 26 between the constraint 16 and the housing 12, and configured as shown in FIG. 1, drastically improves the physical isolation of the sensing element 18, thereby significantly improving the electrical performance of the device 10 while also reducing hysteresis. In particular, stresses transmitted through the housing 12 or arising as a result of material mismatch are concentrated within the insert 26.

As shown in FIG. 1, the insert 26 is recessed into the surface of the housing 12. While various methods can be employed to achieve this configuration, a preferred technique is to form the housing 12 from plastic and mold-in the insert 26 in a conventional manner. The relative size of the insert 26 is preferably as shown, such that the entire constraint 16 is supported by the insert 26 and is spaced apart from the housing 12. As shown in FIG. 1, the passage 24 within the constraint 14 and housing 12 preferably extends through the insert 26.

The constraint 16 is shown as being bonded directly to the insert 26 with an adhesive 34. In accordance with this invention, the adhesive 34 is preferably a chemical-resistant material, such as an epoxy. The conventional requirement of using a flexible adhesive, such as a silicone, to reduce the transmission of stresses to the sensing element is unnecessary due to the effectiveness of the insert 26. As a result, the relatively poor chemical resistance of flexible adhesives is not a limitation on the use of the sensing device 10 of this invention, making the device 10 particularly well suited for such hostile environments as automotive fuel systems.

To enhance its effectiveness, the insert 26 is preferably formed from a glass material, such as borosilicate, having a coefficient of thermal expansion approximately equal to that of the constraint 16, and therefore approximately equal to that of the sensing element 18. By substantially matching the material of the insert 26 to the constraint 16 and the sensing element 18, these three components react similarly to temperature changes and external forces, such that any extraneous stresses will have a significantly reduced effect on the accuracy of the sensing device 10. Though a material mismatch exists between the insert 26 and the housing 12 into which the insert 26 is recessed, the adverse effect of this mismatch is primarily absorbed by the insert 26.

In view of the above, it can be seen that the insert 26 of this invention advantageously isolates stress from the pressure cell 14, while incurring minimal material and processing costs. In particular, the insert 26 achieves superior isolation of the sensing element 18 from extraneous stresses without necessitating an increase in the size of either the housing 12 or the constraint 14. As a result, the disadvantages of increasing the size of these components, including potential retooling costs, are avoided. In addition, the insert 26 avoids the necessity of using the same material throughout the sensing device 10, which would also result in higher manufacturing costs. By in-molding the insert 26 into the body of the housing 12, each component of the sensing device 10 can be optimized in accordance with its specific functional and structural requirements.

Figure 2:
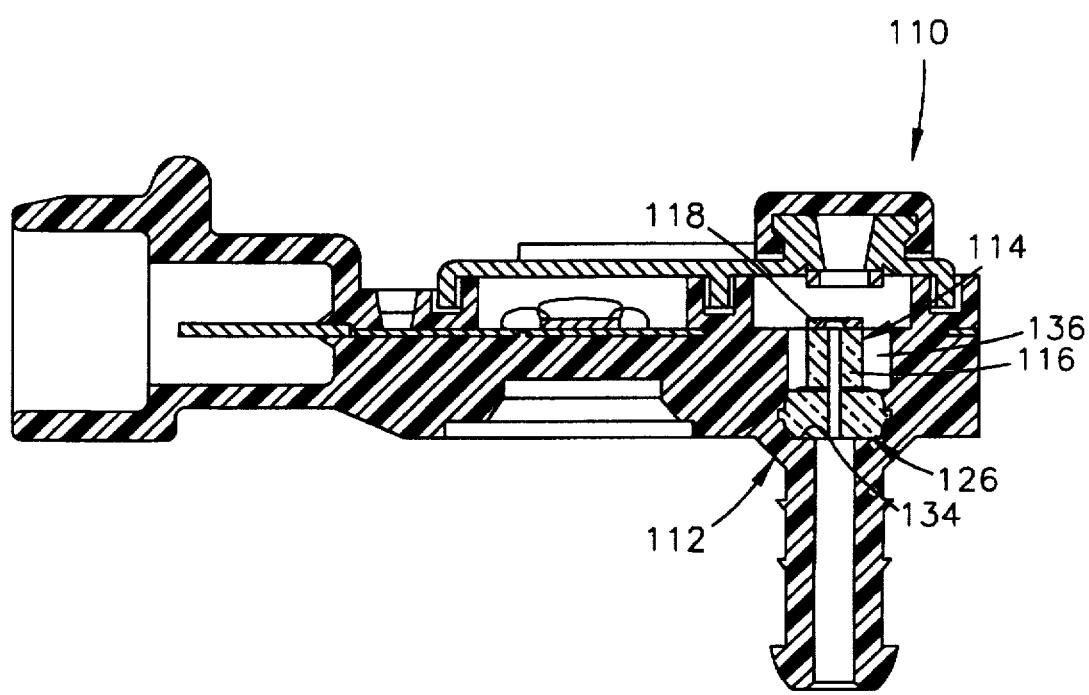
FIG. 2 is a cross-sectional view of a pressure sensing device in accordance with a second embodiment of this invention, in which the sensing device is shown within a fuel vapor pressure sensing unit of an automobile.

A particularly useful application for a sensing device configured with an insert in accordance with this invention is an automotive fuel vapor pressure sensor 110, shown in FIG. 2. The application shown in FIG. 2 is particularly well suited to benefit from the advantages made possible by this invention, in that the fuel vapor pressure sensor 110 is required to sense low pressures, e.g., near and below atmospheric pressure, within a hostile chemical environment posed by the presence of fuel vapors. Furthermore, unless modified with the insert of this invention, the extreme temperature conditions to which an automobile is subjected renders such a piezoresistive sensor particularly prone to hysteresis in the sensor's output due to material mismatch.

As with the sensing device 10 of FIG. 1, the pressure sensor 110 shown in FIG. 2 includes a pressure cell 114 enclosed within a housing 112, in which the cell 114 is composed of a constraint 116 and a sensing element 118. The cell 114 is entirely supported on an insert 126 whose material is matched with the constraint 116 and the sensing element 118, as described previously. In this particular embodiment, the cell 114 and insert 126 are shown as being disposed within a passage 136 formed in the housing 112, with the insert 126 being integrally molded within the passage 136 so as to be supported on an annular shoulder 134 formed in the housing 112. In this manner, only the peripheral surface and a radially-outward portion of one axial surface of the insert 126 is abutted against the housing 112. Stresses transmitted through the housing 112 or arising from the material mismatch between the insert 126 and the housing 112 are concentrated within the insert 126, essentially as described above for the embodiment of FIG. 1.

While the interface between the insert 126 and the housing 112 differs from that shown in FIG. 1, similar improvements are achieved due to the use and unique configuration of the insert 126. Notably, testing of sensors of the type shown in FIG. 2 have indicated a reduction in hysteresis on the order of about a factor of seven in comparison to identical sensors not equipped with the insert 126. In practice, suitable relative sizes for the constraint 116 and the insert 126 are characterized by an insert whose height is about 40 percent of that for the constraint, and whose width is about 60 percent greater than the constraint, though it is foreseeable that different relative sizes for the insert and constraint could be successfully employed.

In view of the above, it can be seen that a significant advantage of this invention is that it provides a piezoresistive pressure sensor whose sensitivity is enhanced by isolating its sensing element from external mechanical stresses transmitted through the sensor housing and thermally-induced stresses that arise due to a material mismatch between the housing and the remaining components of the sensor. More specifically, this invention provides for the use of an insert that inhibits the transmission of stresses from the housing to the sensing element, and therefore promotes the sensitivity of the sensing element and reduces hysteresis in the output of the sensing element. Consequently, the sensing device of this invention is more readily able to accurately sense low pressures, such as pressures roughly at and below atmospheric pressure, because the sensing element is relatively isolated from stresses that would otherwise result in a significant output error if the magnitude of external stresses is comparatively greater than stresses induced in the sensing element by pressures exerted by its surroundings.

Another advantage of this invention is that the insert is able to effectively isolate the sensing element without complicating the construction and fabrication of a sensor and its components. As such, the invention provides for a cost efficient method for achieving enhanced sensitivity to low pressures, and is therefore well suited for mass produced sensors, such as automotive sensors used to sense low pressures. Furthermore, the insert can be incorporated into an existing sensor design while avoiding the necessity for resizing or significantly redesigning the remaining components of the sensor. For example, an oversized constraint need not be used in an effort to further reduce the transmission of thermally-induced stresses to the sensing element. As a result, the low temperature electrical performance of the sensing device is not compromised by using a relatively large constraint, and the sensor housing is not required to be redesigned to accommodate a larger constraint member. Finally, a constraint employed within a pressure sensor incorporating the insert of this invention is not required to be bonded to the insert with a flexible adhesive, which is typically prone to attack by a hostile chemical environment. Instead, a chemically-resistant adhesive can be used, even though the adhesive is relatively inflexible after curing.

While our invention has been described in terms of a preferred embodiment, it is apparent that other forms could be adopted by one skilled in the art. For example, the appearance or structure of the sensors shown in the Figures could be altered, and appropriate materials could be substituted for those disclosed. Accordingly, the scope of our invention is to be limited only by the following claims.

The embodiments of the invention in which an exclusive property or privilege is claimed are defined as follows:

1. A pressure sensing device comprising:

a housing having a coefficient of thermal expansion;

a sensing element mounted to the housing, the sensing element being formed from a material whose electrical properties change in response to a pressure exerted on the sensing element by a surrounding environment, the material having a coefficient of thermal expansion that is different than the coefficient of thermal expansion of the housing;

a constraint member with which the sensing element is interconnected to the housing such that the sensing element is spaced apart from the housing, the constraint member having a coefficient of thermal expansion that is approximately equal to the coefficient of thermal expansion of the sensing element or intermediate the coefficients of thermal expansion of the sensing element and the housing; and an insert disposed in the housing so as to be intermediate the constraint member and the housing, the insert having a peripheral surface of which at least a portion contacts the housing, the insert having a coefficient of thermal expansion that is approximately equal to the coefficient of thermal expansion of the sensing element or intermediate the coefficients of thermal expansion of the sensing element and the housing, such that the sensing element and the constraint member are substantially isolated from external stresses transmitted through the housing.

2. A pressure sensing device as recited in claim 1, wherein the coefficients of thermal expansion of the constraint member, the insert and the sensing element are less than the coefficient of thermal expansion of the housing.

3. A pressure sensing device as recited in claim 1, wherein the constraint and the insert are constructed from a glass material.

4. A pressure sensing device as recited in claim 1, wherein the sensing element comprises an integrally-formed diaphragm.

5. A pressure sensing device as recited in claim 4, wherein the diaphragm has a first surface exposed to the surrounding environment and a second surface in fluidic communication with a reference pressure.

6. A pressure sensing device as recited in claim 5, wherein the constraint member includes a passage in fluidic communication with the second surface of the sensing element.

7. A pressure sensing device as recited in claim 1, further comprising an adhesive bonding the constraint member to the insert.

8. A pressure sensor adapted for sensing pressures near and below atmospheric pressure, the pressure sensor comprising:

a housing formed from a first material having a coefficient of thermal expansion;

a piezoresistive sensing element enclosed within the housing, the sensing element having an integrally-formed diaphragm with a first surface, the sensing element being formed from a second material whose electrical resistance changes in response to a pressure exerted on the first surface of the diaphragm by a surrounding environment, the second material having a coefficient of thermal expansion that is less than the coefficient of thermal expansion of the housing;

a constraint member with which the sensing element is interconnected to the housing such that the sensing element is spaced apart from the housing, the constraint member being formed from a third material having a coefficient of thermal expansion that is approximately equal to the coefficient of thermal expansion of the sensing element;

an insert disposed in the housing so as to be intermediate the constraint member and the housing, the insert having a peripheral surface of which at least a portion contacts the housing, the insert having a coefficient of thermal expansion that is approximately equal to the coefficient of thermal expansion of the sensing element, such that the sensing element and the constraint member are substantially isolated from stresses transmitted through the housing; and an adhesive bonding the constraint member to the insert;

wherein electrical performance of the sensing element to near-atmospheric and lower pressures is promoted by the sensing element being isolated from stresses transmitted through the housing.

9. A pressure sensor as recited in claim 8, wherein the constraint member is entirely supported on the insert.

10. A pressure sensor as recited in claim 8, wherein the constraint and the insert are constructed from a glass material.

11. A pressure sensor as recited in claim 8, wherein the sensing element is formed from a silicon material.

12. A pressure sensor as recited in claim 11, wherein the diaphragm has a second surface in fluidic communication with a reference pressure.

13. A pressure sensor as recited in claim 12, wherein the constraint member includes a passage in fluidic communication with the second surface of the diaphragm.

14. A fuel vapor pressure sensor comprising:

a housing formed from a plastic material having a coefficient of thermal expansion;

a piezoresistive sensing element enclosed within the housing, the sensing element having an integrally-formed diaphragm with a first surface and an oppositely-disposed second surface, the sensing element being formed from a piezoresistive material whose electrical resistance changes in response to a pressure exerted on the first surface of the diaphragm by a surrounding environment, the piezoresistive material having a coefficient of thermal expansion that is less than the coefficient of thermal expansion of the housing;

a constraint member with which the sensing element is interconnected to the housing such that the sensing element is spaced apart from the housing, the constraint member including a passage in fluidic communication with the second surface of the diaphragm, the constraint member being formed from a glass material having a coefficient of thermal expansion that is approximately equal to the coefficient of thermal expansion of the sensing element;

an insert molded into the housing so as to be intermediate the constraint member and the housing, the insert having a peripheral surface entirely contacting the housing and an axial passage in fluidic communication with the passage of the constraint member and the second surface of the diaphragm, the insert being formed from a glass material having a coefficient of thermal expansion that is approximately equal to the coefficient of thermal expansion of the sensing element, such that the sensing element and the constraint member are substantially isolated from stresses transmitted through the housing; and an adhesive bonding the constraint member to the insert;

wherein the electrical performance of the sensing element to fuel vapor pressures is promoted by the sensing element being isolated from stresses transmitted through the housing.

* * * * *